United States Patent
Chi et al.

(10) Patent No.: US 8,392,446 B2
(45) Date of Patent: Mar. 5, 2013

(54) SYSTEM AND METHOD FOR PROVIDING VECTOR TERMS RELATED TO A SEARCH QUERY

(75) Inventors: Liang-Yu Chi, San Francisco, CA (US); Swati Raju, San Jose, CA (US); Ashley Hall, Menlo Park, CA (US); Peter Anick, Marlborough, MA (US)

(73) Assignee: Yahoo! Inc., Sunnyvale, CA (US)

( * ) Notice: Subject to any disclaimer, the term of this patent is extended or adjusted under 35 U.S.C. 154(b) by 231 days.

(21) Appl. No.: 11/755,851

(22) Filed: May 31, 2007

(65) Prior Publication Data

US 2008/0301113 A1    Dec. 4, 2008

(51) Int. Cl.
*G06F 17/30* (2006.01)
(52) U.S. Cl. ........................................ 707/767
(58) Field of Classification Search .................... 707/767
See application file for complete search history.

(56) References Cited

U.S. PATENT DOCUMENTS

| 6,947,930 B2 * | 9/2005 | Anick et al. ................ 707/5 |
| 7,765,204 B2 * | 7/2010 | Gollapudi et al. ............ 707/721 |
| 2002/0059297 A1 * | 5/2002 | Schirmer et al. ............ 707/104.1 |
| 2003/0084059 A1 * | 5/2003 | Kelley et al. ................. 707/102 |
| 2003/0221167 A1 * | 11/2003 | Goldstein et al. ............. 715/513 |
| 2005/0080795 A1 * | 4/2005 | Kapur et al. .................. 707/100 |
| 2005/0210042 A1 * | 9/2005 | Goedken ....................... 707/100 |
| 2007/0192314 A1 * | 8/2007 | Heggem ........................... 707/5 |

OTHER PUBLICATIONS

Garrett, Ajax: A New Approach to Web Applications, Feb. 18, 2005, Adaptive Path.*
Wikipedia, "Ajax (programming)": May 30, 2006, accessed Mar. 11, 2010 at http://en.wikipedia.org/w/index.php?title=Ajax_(programming)&oldid=55978901.*
Stiles, "Hacking Google Suggest": Dec. 10, 2004, accessed Mar. 11, 2010 at http://adamstiles.com/2004/12/hacking_google_/.*

* cited by examiner

*Primary Examiner* — William Spieler
(74) *Attorney, Agent, or Firm* — Seth H. Ostrow; Ostrow Kaufman LLP (57) ABSTRACT

The present invention relates to providing vector terms for use in formulating search requests in response to a user query. The method according to one embodiment comprises receiving a search query from a client and identifying links to one or more content items corresponding to the search query. One or more term vectors are then generated corresponding to the content items and one or more vector terms are selected from the term vectors. The links to the one or more content items and selected vector terms are combined to form a final result page.

22 Claims, 6 Drawing Sheets

SYSTEM AND METHOD FOR PROVIDING VECTOR TERMS RELATED TO A SEARCH QUERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to providing search results to a user. More specifically, the invention relates to providing vector terms related to a user search query allowing a user to modify the original search query and generate more relevant search results.

BACKGROUND OF THE INVENTION

Current search technologies allow a user to enter a search query and are operative to return a plurality of search result matches to a user. The existing structure of a search result page usually consists of a listing of the search results corresponding to the search query, which a search engine may present in conjunction with extraneous elements such as advertising links, links to other services of the search engine, etc.

The current state of search engines provide a stepping stone or conduit to a subsequent webpage, that is, there is nothing to distinguish search engines among one another, and thus nothing exists to entice a user to remain with a specific search engine. Additionally, most search engines lack an interactive element, allowing the users to visually mold there search queries. The user's only option is to enter a search term and select a search result that looks like a good match given the query the he or she provides.

Thus there exists a need in the art for a more interactive search engine solution and experience that allows users to actively update their search strategy and to simultaneously generate repeat visits to a particular search engine. Embodiments of the present invention provide solutions wherein vector terms related to a users search result set allow a user to narrow or change their search query in response to the currently retrieved result set for a given query. Embodiments further allow a user to remain at a given search engine while modifying his or her query. Embodiments also allow a user to manually update his or her search to generate a result set containing the most relevant results for his or her search needs.

SUMMARY OF THE INVENTION

The present invention is directed towards methods, systems and computer readable media comprising program code for providing search vector terms in response to a user query. The method of the present invention comprises receiving a search query from a client and identifying a result set comprising links to a plurality of content items corresponding to the search query.

In response to the identification of a plurality of content items, a plurality of term vectors are generated corresponding to the content items and one or more vector terms are selected from the term vectors. The vector terms and content items are combined to form a search result page. In accordance with one embodiment, the vector terms are provided in a separate vector component on the result page. The vector component may contain at least on control element; for example, the control element may be an expanding/collapsing control.

The selection of a vector term may cause a second search query to be executed; the second search query being comprised of the original search query and the selected vector term. The second search query may be performed synchronously or asynchronously. The execution of a second search query may result in a search result set comprising a plurality of second content items and a second set of vector terms forming a second result page.

The selection of a second vector term from the second set of vector terms may result in the execution of a third search query resulting in appropriate search results and a third set of vector terms forming a third result page. The third search query may also be performed synchronously or asynchronously. The third search query string may comprise a plurality of different terms. In one embodiment, the third search query string may comprise the original search query and the second selected vector term. In alternative embodiments, the third search query may comprise the original search query, the first selected vector term and the second vector term. In yet another embodiment, the third search query may comprise the first and second selected vector terms.

The present invention is further direct to a system for providing search vector terms in response to a user query. The system of the present invention comprises a plurality of client devices and a search provider connected to a network. A search server is operative to receive search queries from the client devices and to generate a search result set comprising a plurality of content items from a content data store or links thereto. A vector term generator is operative to generate one or more term vectors corresponding to said content items in the search result set and to select one or more vector terms from said one or more term vectors. The search server may further be operative to combine said content items in the result set with said vector terms to form a search result page.

In accordance with one embodiment, the vector terms are provided in a separate vector component on the result page, which may be a search result page. The vector component may contain at least on control element, e.g., an expansion/collapse control. Alternatively, or in conjunction with the foregoing, the vector component is always available, thereby providing a reliable navigation element.

The selection of one of the plurality of the vector terms may cause a second search query to be executed; the second search query comprising the original search query and the selected vector term. The second search query may be performed synchronously or asynchronously. The execution of the second search query may result in a search result set comprising a plurality of second content items and a second set of vector terms forming a second result page.

The selection of a second vector term from the second set of vector terms may result in a third search query being executed. The execution of a third search query may result in a search result set comprising a plurality of third content items and a third set of vector terms forming a third result page. The third search query may be performed synchronously or asynchronously. The third search query string may comprise a plurality of different terms. For example, the third search query may comprise the original search query and the second selected vector term. In alternative embodiments, the third search query may comprise the original search query, the first selected vector term and the second vector term. In yet another embodiment, the third search query may comprise the first and second selected vector terms.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
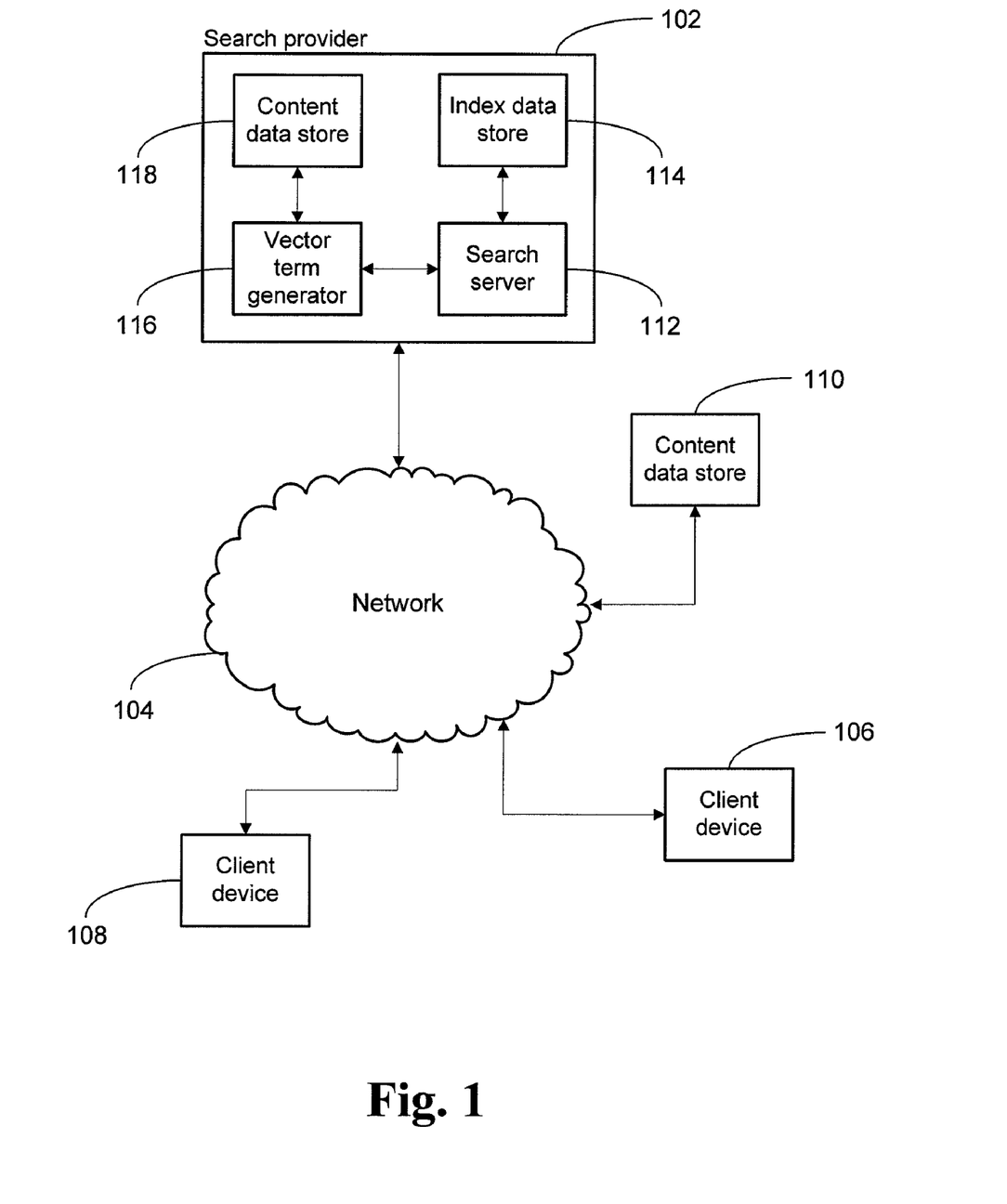
FIG. 1 presents a block diagram illustrating a system for providing search results to a user based upon a user query and subsequent user interaction according to one embodiment of the invention.

FIG. 1 presents a block diagram illustrating a system for providing search results to a user based upon a user query and subsequent user interaction according to one embodiment of the invention. According to the embodiment illustrated in FIG. 1, one or more client devices 106 and 108 are communicatively coupled to a network 104, which may include a connection to one or more local and wide area networks, such as the Internet. According to one embodiment of the invention, a given client device 106 and 108 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 106 and 108 may be in communication with a search provider 102. The search provider 102 may maintain one or more search servers 112, a given search server 112 operative to search one or more content data stores, 110 and 118, for content items, such as web pages, residing thereon that are responsive to a search query. The search provider 102 may also comprise a content data store 118 operative to store and transmit one or more content items in response to a request from a client device 106 and 108. For example, the search provider 102 may comprise a web site that includes a search server 112 (e.g., APACHE™, INTERNET INFORMATION SERVER™, etc.) and a content data store 118, which according to one embodiment is a database that maintains web pages in an organized and structured manner. The search provider 102 may further maintain program code that, when executed by the search provider 102, is operative to search the content data store 118 and dynamically generate one or more content items, e.g., a search results page.

A given client device 106 and 108 in communication with the search provider 102 requests a search result page that a search server 112 generates at the search provider 102. Typically, the search server 112 maintains dynamic information at the search provider 102 for delivery to a client device 106 and 108. For example, where the search server 112 is using the search provider 102 to host one or more web pages, the search provider 102 may provide the HTML or page markup to a given client 106 and 108, which the search provider 102 may generate dynamically on the basis of program or scripting code that the search server 112 maintains at the search provider 102, e.g., Active Sever Page, Java Server Page code, PHP, etc.

A resultant search results page that the search provider 102 provides to a client 106 and 108 may have links or references to one or more content items for selection by the client 106 and 108.

As FIG. 1 illustrates, a client device 106 and 108 may submit a request for search results from search provider 102 via search server 112. A request for search results may be the result of a user entering a search query in an HTML textbox, or similar interface. The search server 112 may be operative to provide a first search result comprising a first result set in response to a query from a client device 106 and 108. In accordance with one embodiment, the search server 112 utilizes the index data store 114 to identify a set of one or more content items from a content data store 118 that fall within the score of a user query. The search results that the search server 112 provides may be ordered in accordance with a determined relevancy to the user search query, in addition to other factors or characteristics of the search results, the query or combinations thereof.

Search provider 102 may be operative to generate term vectors in conjunction with the generation of a result set in response to a user query. A vector term generator 116 may be operative to analyze the one or more content items in the result set and generate term vectors for a given one of the one or more content items. The generation of term vectors is described more fully in U.S. Pat. No. 6,947,930, entitled "SYSTEM AND METHOD FOR INTERACTIVE SEARCH QUERY REFINEMENT," which was filed on Apr. 25, 2003, the disclosure of which is hereby incorporated by reference in its entirety. The vector term generator 118 may further be operative to extract the most relevant vector terms from a given vector. In one embodiment, a set limit on the number of returned vector terms may be defined by the search provider 102. In an alternative embodiment, the number of vector terms selected by the vector term generator may be a percentage of the total number of vector terms generated. Other thresholds should be apparent to those of skill in the art.

After the vector terms are determined from the content items included in the result set, the vector term generator provides the vector terms to the search server 112. The search server 112 may be operative to combine the vector terms with the retrieved result set. In accordance with one embodiment, the search server 112 may append the vector terms to a search result page in a separate component, which the user may interact with independent of the search result page. For example, the vector terms may be presented within an HTML DIV element that utilizes asynchronous requests to retrieve content and update the search result page.

The search server 112 returns the combined page to a given client device 106 and 108. After a search result page is presented to a client device 106 and 108, a user may interact with the search result page. A user may select one of the provided vector terms generated by vector term generator 116, which in turn may send a request to the search provider 102. In accordance with one embodiment, the submission of a request due to interaction with a vector term may be accomplished via an asynchronous request that allows a search provider 102 to update the search result page without reloading the entire page. For example, a user may select a vector term that causes the generation of a new result set in place of the original result set, while maintaining the remainder of the search result page. A search result page may further comprise a plurality of search result hyperlinks corresponding to web pages that fall within the scope of the query that the user provides to the search provider 102. On selection of the search result hyperlinks, a search result page may be operative to direct a request for content to an external data store 110.

Selection of a given one of the one or more vector terms instructs the search server 112 to execute a new query of the index at the index data store 114, the new query comprising the original query terms plus the vector term that the user selects. In response, the search server 112 generates a subsequent result set and determines the subsequent vector terms for the subsequent result set on the basis of the content items contained therein. The process of selecting vector terms is described in greater detail herein. The search server 112 provides the subsequent result set and subsequent vector terms to a given client device 106 and 108. The search provider 102 may continue processing the selection of additional or new vector or query terms.

Figure 2:
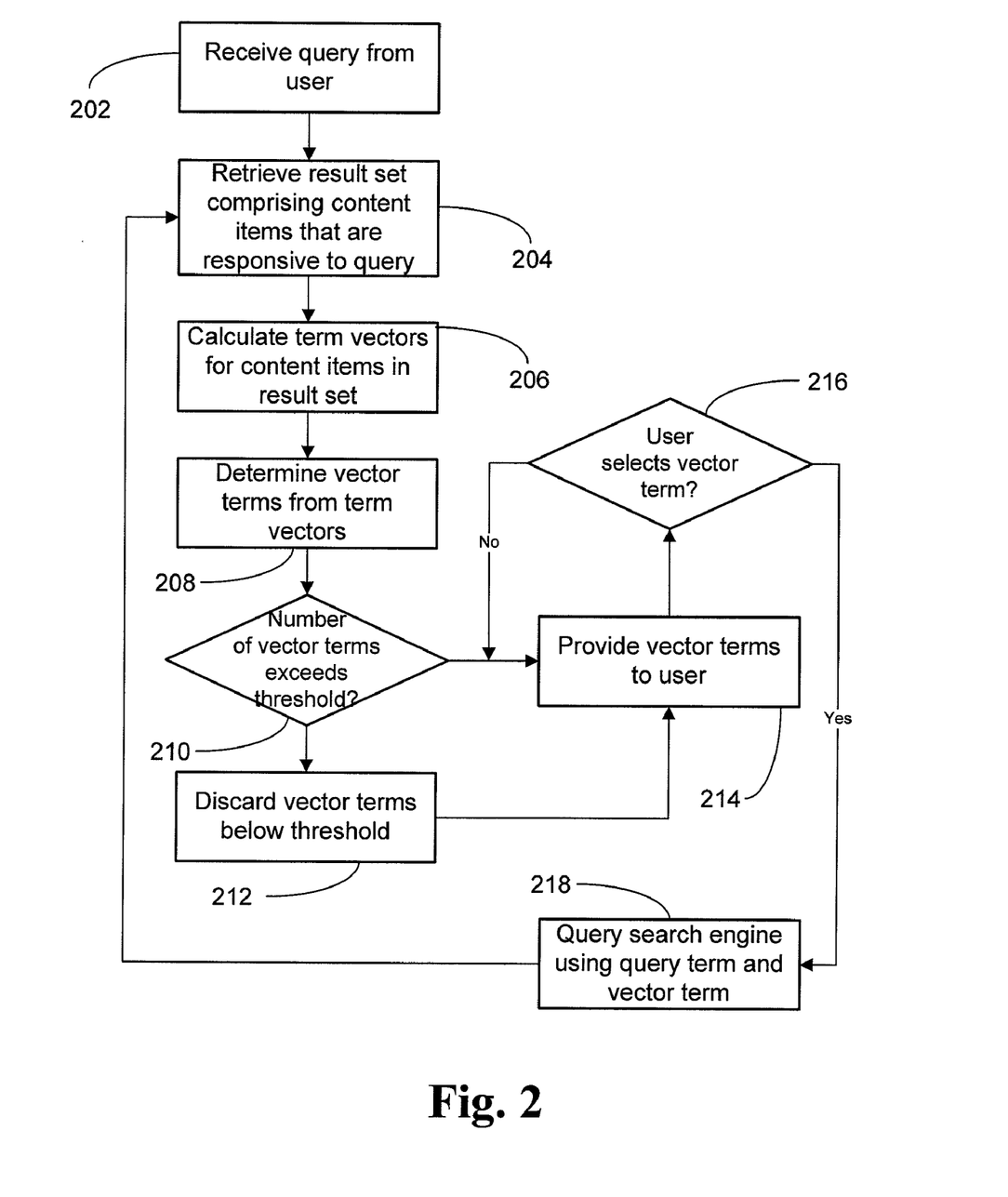
FIG. 2 presents a flow diagram illustrating a method for providing search results to a user based upon a user query and subsequent user interaction according to one embodiment of the present invention.

FIG. 2 presents a flow diagram illustrating a method for providing search results to a user based upon a user query and subsequent user interaction according to one embodiment of the present invention. According to the embodiment of FIG. 2, the process begins with the receipt of a user query, step 202. As previously described, in one embodiment a user query may be the result of a user entering a query string into an HTML text box or similar element. In response to the received user query, a result set comprising links one or more content items responsive to the user query is retrieved, step 204.

While links to the content items corresponding to or falling within the scope of a user query are being retrieved, term vectors for a given content item may be calculated for the one or more content items, step 206. Term vectors are commonly known in the art and may comprise a number of relevant or important terms present within a content item. When generating a term vector, weights may be associated with a given term within the vector, resulting in weighted vector that is operative to identify the most relevant terms within a content item. The generation of term vectors is described fully in previously incorporated U.S. Pat. No. 6,947,930, the disclosure of which is hereby incorporated by reference in its entirety. In one embodiment, only a subset of content items identified in response to a user query are used to generate feature vectors. The subset utilized may correspond to the top N relevant terms that the search engine generates. Alternatively, a plurality of content items within a result set may be utilized to generate a comprehensive set of vectors from the result set.

A plurality of vector terms may be extracted from the term vectors, step 208. A threshold may indicate that the number of vector terms may not surpass a threshold, step 210. In accordance with one embodiment, this threshold may be determined prior to the calculation of vector terms. In an alternative embodiment, the threshold may be determined based on the number of returned term vectors or content items. Various methodologies may be employed to determine which terms from a given vector may be selected for use. For example, if a threshold of M vector terms is selected for a plurality of N vectors, an algorithm may be executed that selects the highest ranked vector terms from vector 1, the highest term from vector 2, etc., until the highest term from vector N is selected. The algorithm may then repeat the process, starting with the second highest term from vector 1. This process continues until reaching a threshold of N terms. Alternatively, an algorithm may scan the one or more term vectors to generate a single vector of a plurality of terms, selecting the highest ranked N terms from the single vector. Finally, if the number of vector terms is within the defined threshold, the vector terms are provided to the user, step 214. If the number of vector terms is above the defined threshold, a subset of the vector terms are discarded, step 212.

After a number of vector terms below a defined threshold are selected, the terms are provided to the user, step 214. The vector terms may be provided as hyperlinks displayed as part of a search result page on a client display. For example, a plurality of vector terms may be displayed as text hyperlinks within an HTML container such as a DIV element, which the search result page may present in conjunction with the search result set.

The user may select one or more vector terms displayed on the client device, such as by clicking on a vector term represented by a hyperlink. If a user selects a vector term, the search engine is queried using the original search term and the vector term, step 218. Subsequently, the method embodied in FIG. 2 is repeated for the query term and the vector term. When a user selects a vector term from the plurality of selected vector terms, an asynchronous search may be performed with the combined query term and vector term. Alternatively, the search may be performed synchronously. Consequently, a new set of query results comprising links to one or more content items and vector terms may be provided to the user. Additionally, a new set of vector terms may replace the currently displayed vector terms.

Figure 3:
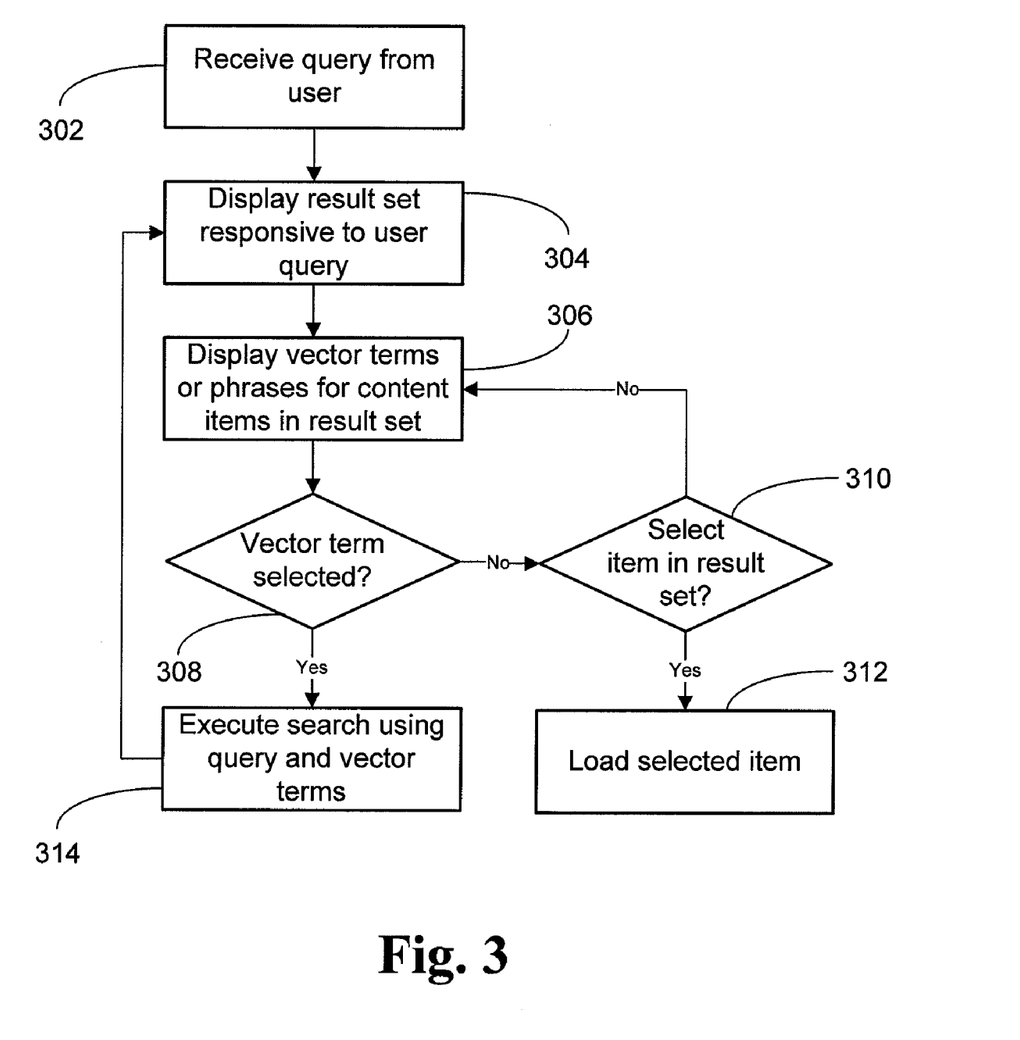
FIG. 3 presents a flow diagram illustrating a method for dynamically updating a search result page according to one embodiment of the present invention.

FIG. 3 presents a flow diagram illustrating a method for dynamically updating vector terms on a search result page according to one embodiment of the present invention. According to the embodiment that FIG. 3 illustrates, a query is received from a user, step 302, and a result set is displayed in response to the user query, step 304.

As described with respect to FIG. 2, a plurality of vector terms or phrases associated with content items linked to in the result set are displayed, step 306. For example, a user may enter the search term "Tottenham Hotspur" which may generate in a result set comprising various links to team information, scores, news, etc. Additionally, vector terms may be generated such as "football", "soccer", "tickets", "London", etc. In accordance with one embodiment, these vector terms are displayed within their own component on the result page. This component may initially be hidden, except for a control allowing the user to expand the component, such as a maximize button, expansion bar, etc. This control may allow a user to expand and select the vector terms only if he or she desires.

When presenting the vector terms to the user, the actions of the user may be monitored to determine if the user selects one of the vector terms, step 308. In one embodiment, the monitoring of user selection may be accomplished with programming code construct such as JavaScript event handlers. In an alternative embodiment, HTML may be utilized to hyperlink the vector terms to a second page.

If a user selects the vector term, a search is executed using the initial query and the newly selected vector term(s), step 314. Continuing the previous example, if a user searching for "Tottenham Hotspur" selects the vector term "tickets", a second query will be executed using a combination of "Tottenham Hotspur" and "tickets". Subsequently, a second result set and second vector terms are generated. If a user does not select a provided vector term, a check is performed to determine whether a user has selected a link to a content item presented in the result set, step 310. If the user selects a link to a content item within the results set, the selected content item is loaded, step 312, which may entail a user selecting a hyperlink on an HTML page that directs a user to a destination page corresponding the search result that the user selects.

Figure 4:
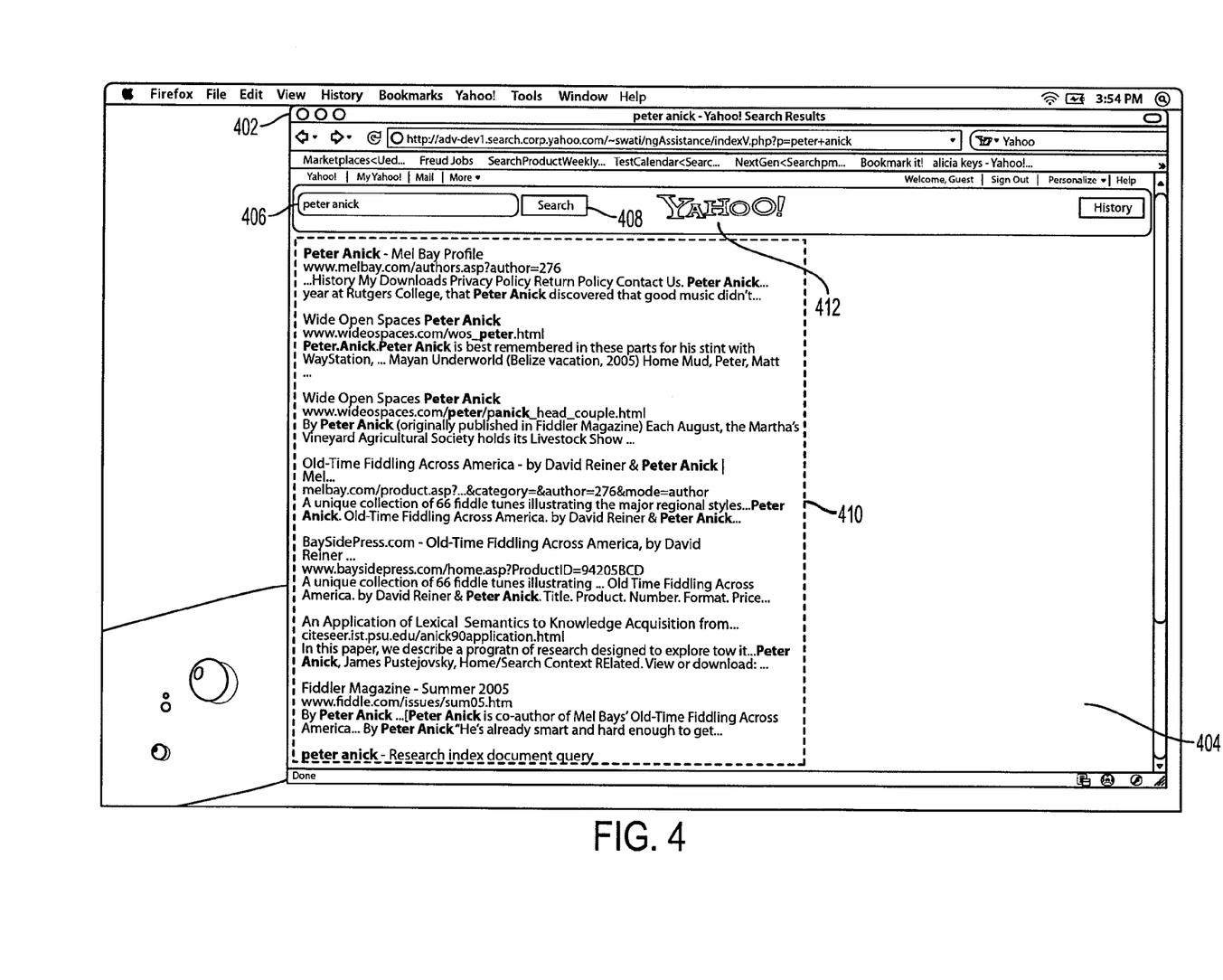
FIG. 4 is a screen diagram illustrating a web page comprising a plurality of search results in response to a user query according to one embodiment of the present invention.

FIG. 4 is a screen diagram illustrating a web page comprising a plurality of search results that a search engine transmits in response to a user query according to one embodiment of the present invention. FIG. 4 illustrates a browser 402 rendering a webpage 404. In the embodiment the FIG. 4 illustrates, a user may enter a search term 406 within an HTML text box and submit the search query to a search engine via a selection of a search control 408.

The embodiment of FIG. 4 illustrates the results of a user searching for the query term 406 "Peter Anick" comprises a result set 410 that the search engine returns in response to the user query. In accordance with one embodiment, the result set 410 may be a collection of hyperlinks to content items that are related to or otherwise fall within the scope of the user search query. The result set 410 may further be organized by increasing relevancy with the most relevant result may be located first.

Webpage 404 may further contain a collapsible assistance panel 412. As illustrated, an assistance panel 412 may contain a control allowing for the expansion or collapse of the assistance panel 412. In accordance with one embodiment, links or other content may be stored within the assistance panel 412 while the panel is collapsed, thereby allowing for the immediate display of the content upon expansion. Alternatively, the assistance panel 412 may initially be empty and may request content from a server upon expansion. For example, an assistance panel 412 may comprise an HTML DIV element that, on expansion, may utilize an asynchronous call method to retrieve content from a server. This content may then be displayed on the client while the user remains on the current page.

Figure 5:
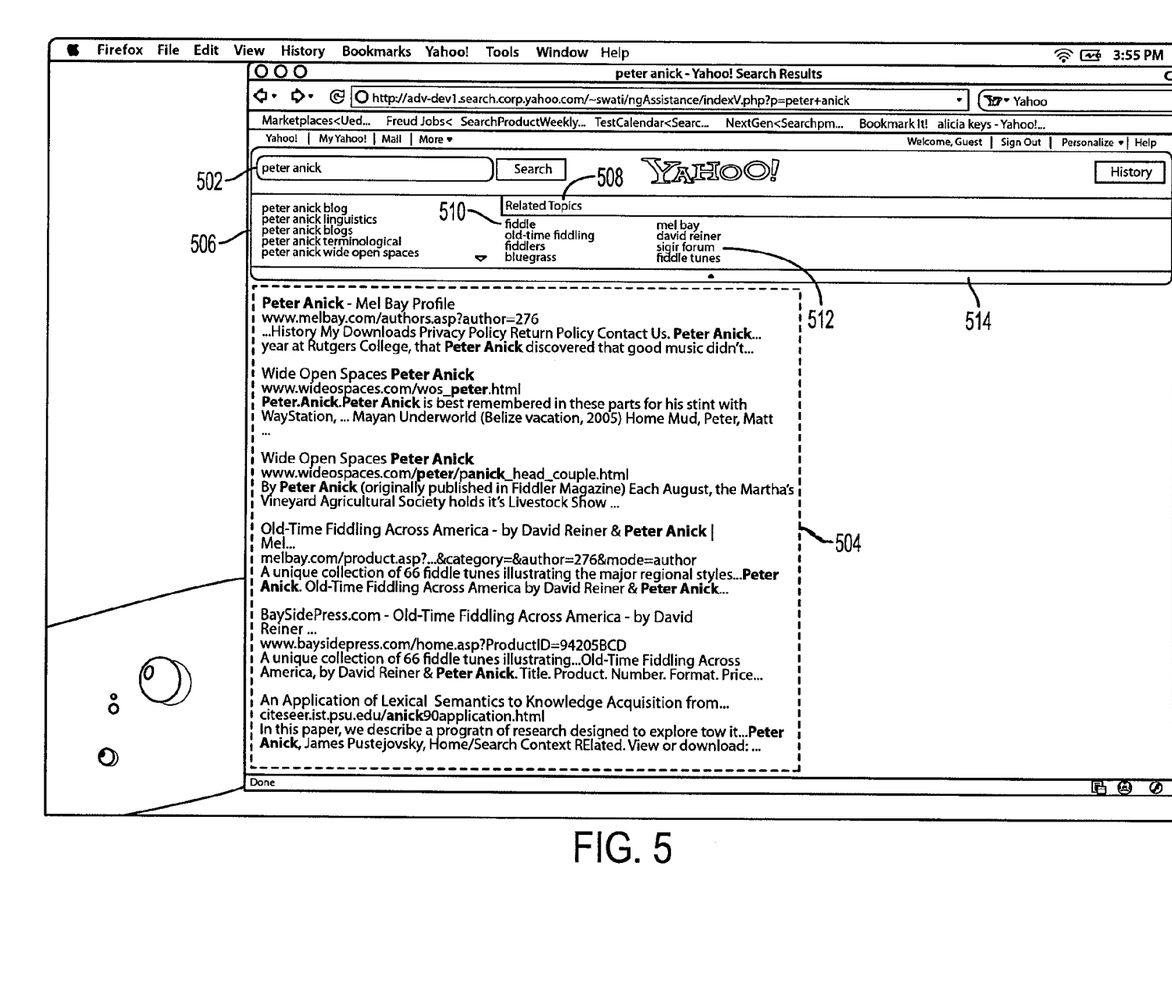
FIG. 5 is a screen diagram illustrating a web page comprising an assistance panel in response to a user query and user interaction according to one embodiment of the present invention.

FIG. 5 is a screen diagram illustrating a web page comprising an assistance panel in response to a user query and user interaction according to one embodiment of the present invention. FIG. 5 illustrates a search result page in response to a user expanding an assistance panel 514. As illustrated, after the assistance panel 514 is expanded, the search query 502 and result set 504 remain as illustrated in the initial response to a search query shown in FIG. 4.

The assistance panel 514 may comprise multiple components such as a suggested search term component 506 and a vector term component 508. In one embodiment, the suggested search term component 506 may contain a list of suggested search terms or phrases based upon the user search query 502. For example, a user searching for "Peter Anick" may be provided with suggested search results "Peter Anick wide open spaces" or "peter anick linguistics". The suggested search results may be based on past user searches from query logs, behavior, click through or click through rate, etc.

The assistance panel 514 may further contain a vector term component 508 containing vector terms 510 and phrases 512 generated on the basis of the result set that is responsive to the user query 502. Accordingly, the vector term component 508 contains a plurality of vector terms or phrases relating the user query of "Peter Anick", such as "fiddle" 510, "mel bay" and "fiddle tunes" 512. Although eight vector terms are shown in the embodiment of FIG. 5, the number of vector terms may be determined by variety of means such as a predefined amount of terms or an amount dependent on the available terms, such as a percentage of the total terms.

Figure 6:
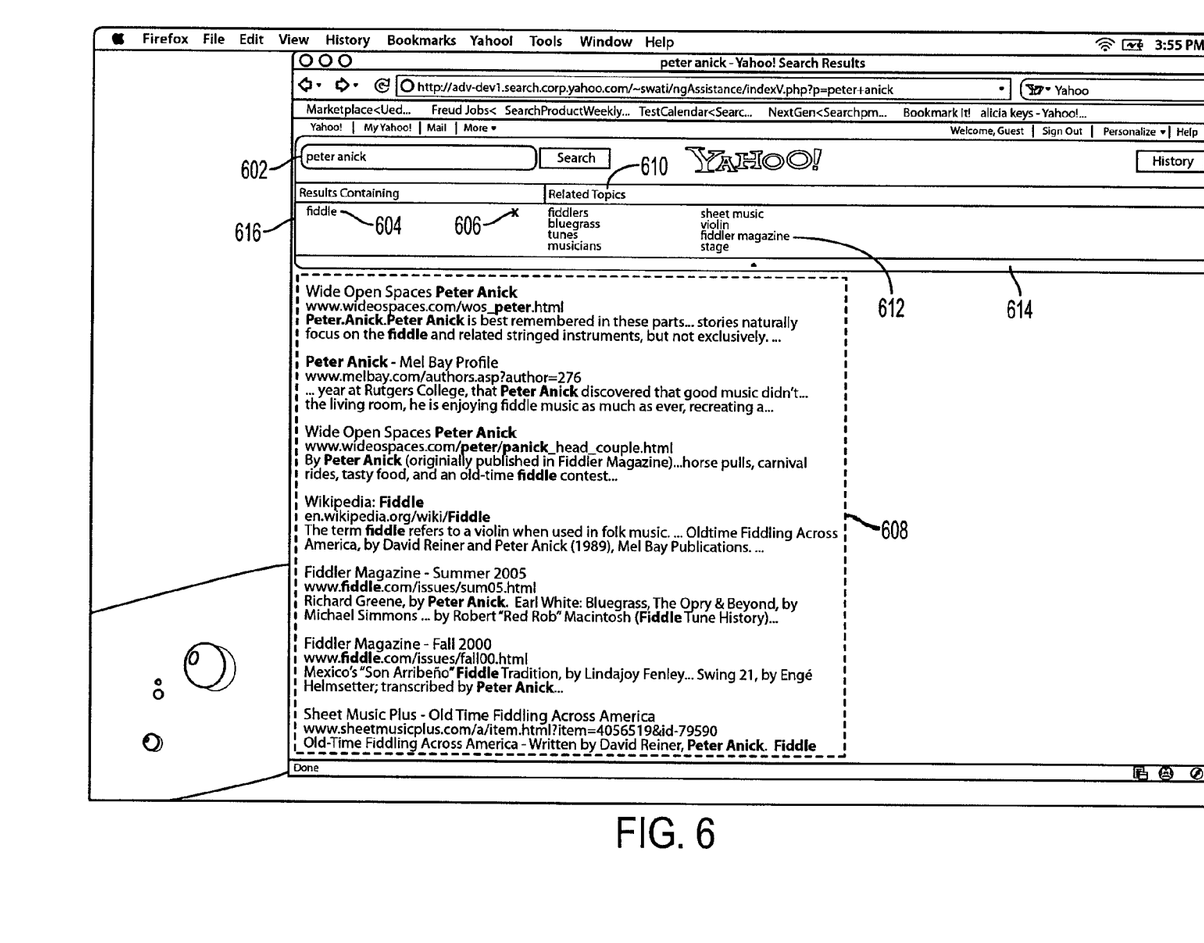
FIG. 6 is a screen diagram illustrating a web page comprising updated search results in response to user interaction according to one embodiment of the present invention.

FIG. 6 is a screen diagram illustrating a web page comprising updated search results in response to user interaction according to one embodiment of the present invention. FIG. 6 shows the result of a search result page after a user has selected a vector term 604 within the vector term component 610.

As illustrated, a user may select the vector term "fiddle" from the previous figure (510). Upon selection of this vector term, a new query is generated comprising the previous query 602 with the selected vector term 604. The new query is executed and the search results are displayed as a new result set 608.

The assistance panel 614 is updated to reflect the selection of the vector term 604. In one embodiment, a new selected vector term component 616 may be generated illustrating the selected vector term 604. The selected vector term component 616 may comprise the selected vector term as well as control elements such as a delete control 606 enabling a user to delete the selected vector term 604.

After the new query is formed and the new result set is retrieved, a new set of vector terms 610 is generated from the content items within the result set 608. This set of vector terms is stored within the vector term component 610. The vector terms stored within vector component 610 may be generated in a similar fashion to the vector terms generated in FIG. 5.

A user may select an additional vector term 612 present within vector component 610. In one embodiment, when a user selects a new vector term 612, a new query is performed combining the original user query and the newly selected vector term 612. For example, if a user selects vector term 612 ("fiddler magazine"), a new query may be executed combining the original search term ("peter anick") 602 and the new vector term 612. Consequently, the new result set of the combined search query may be presented to the client.

Alternatively, when a user selects a new vector term 612, a new query may be generated that combines the previous user query/vector term query with the newly selected vector term 612. For example, if a user originally searches for the string "Peter Anick" and selects the vector term "fiddle", and in response to the newly provided vector terms further selects the vector term "fiddler magazine", a new query combining "peter anick", "fiddle" and "fiddler magazine" may be generated and executed by the search engine.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method of providing a plurality of vector terms in response to a search query, the method comprising:
   receiving a search query from a client and identifying one or more content items corresponding the said search query;
   generating one or more of first term vectors corresponding to said content items, generating a plurality of vector terms from said first terms vectors, and selecting one or more vector terms not exceeding a threshold number of vector terms from said plurality of vector terms, wherein the threshold is determined as a percentage of the total vector terms;
   providing a search results page, the search results page comprising a plurality of search results and an assistance panel, the assistance panel comprising at least a suggested search term component comprising suggested search terms and a vector term component comprising the selected vector terms; and
   combining links to said content items with said vector terms within the search result page, the links to said content items provided in a first section of the search results page and said vector terms provided in a second section of the search results page;
   receiving a selection of a given vector term;
   executing, based on the selected given vector term, a second search query asynchronously;
   generating one or more of second term vectors corresponding to said second query and selecting one or more vector terms from said one or more second term vectors; and
   updating the search results page without programmatically reloading the search results page, where reloading includes receiving an entirely new search results page, and wherein updating the search results page comprises updating the first section of the search results page to include links to content items associated with the second search query and updating the second section to include the one or more vector terms selected from said second term vectors.

2. The method of claim 1, wherein combining comprises providing the vector terms in a separate vector component on said result page.

3. The method of claim 2, wherein providing comprises presenting at least one control.

4. The method of claim 1, wherein the assistance panel comprises at least one control to expand the assistance panel, the search results page is provided with the assistance panel initially empty, and wherein the one or more vector terms corresponding to said content items are generated in response to a selection of the at least one control to expand the assistance panel, the vector term component updated to include the vector terms selected from the one or more first term vectors without reloading the search results page.

5. The method of claim 1, wherein executing the second search query comprises executing a query comprising the search query and the selected given vector term, the assistance panel updated in response to the selection of the given term vector to include a delete control element selectable to delete the selected vector term from the second search query.

6. The method of claim 1, wherein executing comprises generating a second search result set and a second set of vector terms forming a second search result page.

7. The method of claim 6, comprising:
selecting a second vector term; and
executing a third search query.

8. The method of claim 7, wherein said third search query comprises the original search query and said second selected vector term.

9. The method of claim 7, wherein the third search query comprises the original search query, the first selected vector term and the second selected vector term.

10. The method of claim 7, wherein the third search query comprises the first selected vector term and the second selected vector term.

11. The method of claim 7, wherein executing comprises generating a third search result set and a third set of vector terms forming a third result page.

12. A system for providing a plurality of vector terms in response to a search query comprising:
one or more client devices connected to a network;
a search provider connected to said network;
a search server operative to receive search queries from said client devices and to retrieve links to one or more content items from a content data store;
a vector term generator operative to generate one or more first term vectors corresponding to said content items, to generate a plurality of vector terms from said first terms vectors, and to select one or more vector terms not exceeding a threshold number of vector terms from said plurality of vector terms, wherein the threshold is determined as a percentage of the total vector terms; and
said search server further operative to combine said links to one or more content items with said vector terms to form a search results page, wherein the links to said content items provided in a first section of the search results page and said vector terms provided in a second section of the search results page, the search results page comprising a plurality of search results and an assistance panel, the assistance panel comprising at least a suggested search term component comprising suggested search terms and a vector term component comprising the selected vector terms, said search server further operative to receive one or more selected given vector terms and to execute, based on the selected one or more given vector terms, a second search query asynchronously selecting a given vector term, the server operative to execute a second search query asynchronously; to generate one or more of second term vectors corresponding to said second query and select one or more vector terms from said one or more second term vectors; and to update the search results page without programmatically reloading the search results page, where reloading includes receiving an entirely new search results page, and wherein to update the search results page comprises updating the first section of the search results page to include links to content items associated with the second search query and updating the second section to include the one or more vector terms selected from said second term vectors.

13. The system of claim 12, wherein said vector terms are provided in a separate vector component on said result page.

14. The system of claim 13, wherein said vector component further comprises at least one control.

15. The system of claim 12, wherein said assistance panel comprises at least one control to expand the assistance panel, the search results page is provided with the assistance panel initially empty, and wherein the one or more vector terms corresponding to said content items are generated in response to a selection of the at least one control to expand the assistance panel, the vector term component updated to include the vector terms selected from the one or more first term vectors without reloading the search results page.

16. The system of claim 12, wherein the second search query comprises the original search query and the selected vector term, the assistance panel updated in response to the selection of the given term vector to include a delete control element selectable to delete the selected vector term from the second search query.

17. The system of claim 12, wherein the execution of a second search query results in one or more links to second content items and a second set of vector terms forming a second result page.

18. The system of claim 17, wherein the selection of a second vector term causes a third search query to be executed.

19. The system of claim 18, wherein said third search query comprises the original search query and said second selected vector term.

20. The system of claim 18, wherein the third search query comprises the original search query, the first selected vector term and the second selected vector term.

21. The system of claim 18, wherein the third search query comprises the first selected vector term and the second selected vector term.

22. The method of claim 18, wherein the execution of a third search query results in one or more third content items and a third set of vector terms forming a third results page.

* * * * *